United States Patent
Dahl et al.

(10) Patent No.: US 12,146,285 B2
(45) Date of Patent: Nov. 19, 2024

(54) CONNECTION SYSTEM, A METHOD FOR CONNECTING TWO MODULES, AND A FLOOD BARRIER MODULE SYSTEM

(71) Applicant: Aquafence AS, Oslo (NO)

(72) Inventors: Fred Schandorff Dahl, Nøtterøy (NO); Francesco Rugiano Beckmann, Tønsberg (NO); Rihards Rozins, Ogre Ogres nov. (LV); Martins Vasuks, Ventspils reg (LV)

(73) Assignee: Aquafence AS, Oslo (NO)

( * ) Notice: Subject to any disclaimer, the term of this patent is extended or adjusted under 35 U.S.C. 154(b) by 164 days.

(21) Appl. No.: 17/787,396

(22) PCT Filed: Dec. 18, 2020

(86) PCT No.: PCT/EP2020/087196
§ 371 (c)(1),
(2) Date: Jun. 20, 2022

(87) PCT Pub. No.: WO2021/123290
PCT Pub. Date: Jun. 24, 2021

(65) Prior Publication Data
US 2023/0012878 A1    Jan. 19, 2023

(30) Foreign Application Priority Data

Dec. 20, 2019  (NO) .................................. 20191512

(51) Int. Cl.
E02B 3/10    (2006.01)
F16B 2/18    (2006.01)
E06B 9/00    (2006.01)

(52) U.S. Cl.
CPC .............. *E02B 3/106* (2013.01); *F16B 2/185* (2013.01); *E06B 2009/007* (2013.01)

(58) Field of Classification Search
CPC ..... E02B 3/106; F16B 2/185; E06B 2009/007
See application file for complete search history.

(56) References Cited

FOREIGN PATENT DOCUMENTS

| CN | 106120645 A | | 11/2016 | |
|----|-------------|---|---------|---|
| CN | 107268524 A | * | 10/2017 | ............. E02B 3/106 |
| CN | 107419708 A | * | 12/2017 | |
| CN | 207130675 U | | 3/2018 | |
| CN | 109958110 A | * | 7/2019 | ............... E02B 7/22 |
| CN | 112609635 A | * | 4/2021 | |
| DE | 202006018777 U1 | | 2/2007 | |

(Continued)

*Primary Examiner* — Frederick L Lagman
(74) *Attorney, Agent, or Firm* — Laine IP Oy

(57) ABSTRACT

A connection system for connecting at least one membrane to a rigid support, the connection system comprising:
at least one elongated clamping profile,
at least one locking unit configured for attaching the at least one elongated clamping profile to the rigid support, thereby clamping a portion of the at least one membrane between the at least one elongated clamping profile and the rigid support so as to achieve a sealing between the at least one membrane and the rigid support,
wherein the at least one locking unit is a discrete state locking unit movable between several predetermined locking unit states, each locking unit state corresponding to a connection system stage, the predetermined locking unit states including: an open state, a closed state and an intermediate state.

15 Claims, 12 Drawing Sheets

(56) References Cited

FOREIGN PATENT DOCUMENTS

| | | | |
|---|---|---|---|
| EP | 1241299 A2 * | 9/2002 | ............ E02B 3/106 |
| GB | 2191808 A | 12/1987 | |
| GB | 2373811 A | 10/2002 | |
| JP | S63210307 A | 9/1988 | |
| JP | 2006283454 A | 10/2006 | |
| JP | 2008163639 A | 7/2008 | |
| WO | WO2010130406 A1 | 11/2010 | |
| WO | WO2018011605 A1 | 1/2018 | |
| WO | WO-2021123290 A1 * | 6/2021 | ............ E02B 3/106 |

* cited by examiner

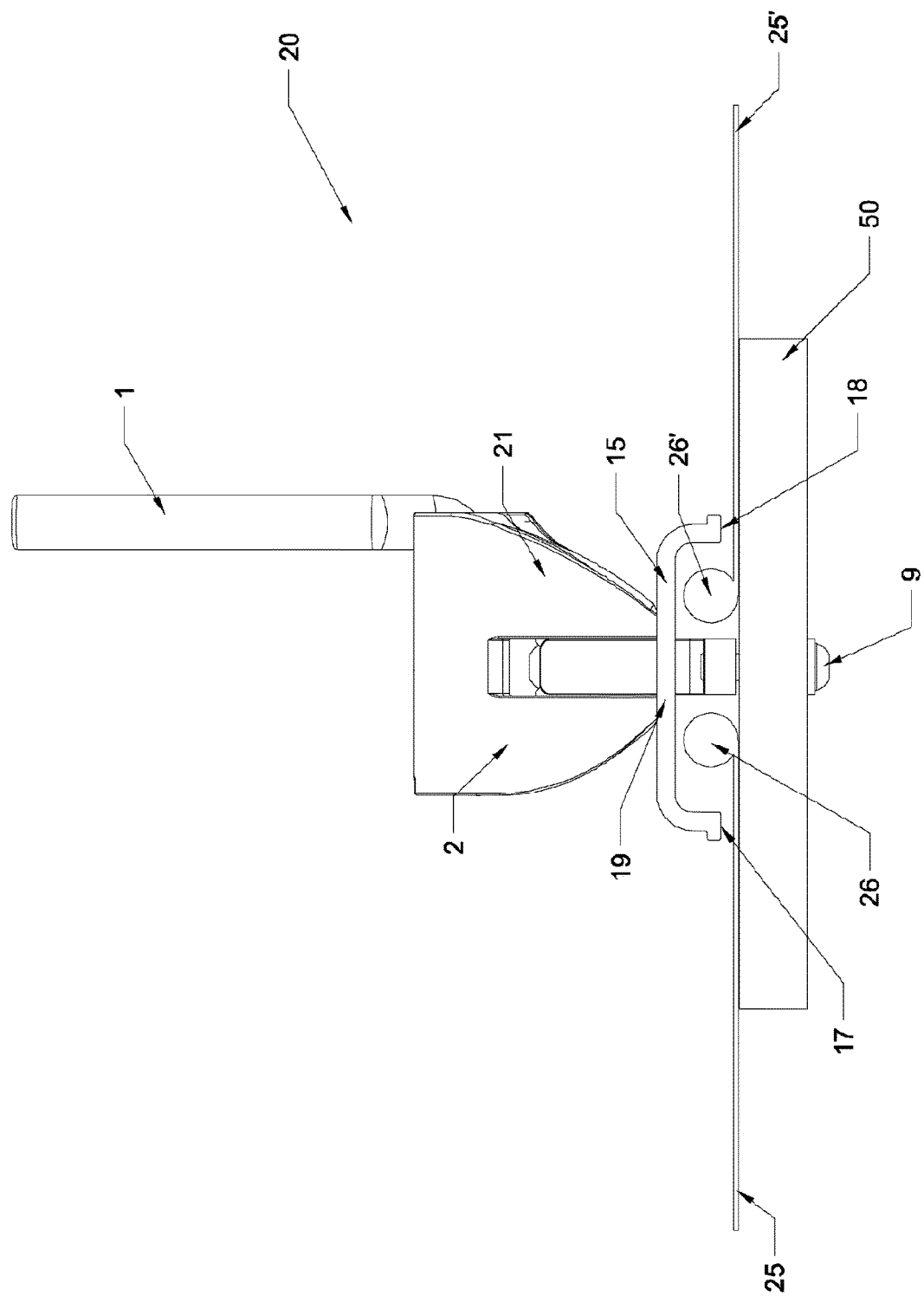

CONNECTION SYSTEM, A METHOD FOR CONNECTING TWO MODULES, AND A FLOOD BARRIER MODULE SYSTEM

TECHNICAL FIELD

The present invention relates to a connection system for connecting at least one membrane to at least one rigid support. The invention also relates to a method for connecting two modules using the connection system, and a flood barrier module system. The invention is particularly useful when the required connection spans more than one spatial plane, for example if the connection is between two modules, each module comprising rigid supports paired at a substantially 90° angle, such as an L-shaped cross section.

BACKGROUND

It is known in the case of flood to deploy light portable barriers to protect property and people. These barriers are typically made of portable modules, which need to be connected. Such connection work needs to be done quickly and may involve connecting many modules. It is common to connect the modules via screwed bolts or knobs. Whether hand- or machine-actuated, these bolts make such connection work time-consuming and little ergonomic.

In the typical case where two neighbouring barriers need to be connected by 6 screws, and for a perimeter of 100 m which may require the mobilisation of 50 barrier modules, 300 bolts need to be manipulated. For more extreme flood levels, such as a 2.7 meters flood level, the number of modules to be assembled for a 100-meter defence perimeter is approximately 100 and the number of bolts to be manipulated is close to 1200.

The panels constituting the barrier module, typically two, need to be adjusted upon connection, in order to optimise the efficiency of the barrier. In the case of barrier modules made of typically two panels per barrier module, one horizontal and one vertical, connected by a hinge, adjustment of each panel relatively to the other panel of the same module and relatively to the corresponding panel of the neighbouring module is improving protection. As will be described in more details below, at least three adjustments for each bolt may be required during installation. That may mean at least 3600 operations on bolts for a 100 meters long barrier!

There is a need for a connection system between a membrane and a panel allowing relative adjustment without severing the connection between the membrane and the panel nor demanding repeated actuation of the bolts, for which the method of operating is well defined, easy to teach other persons and execute, and which would highly shorten installation time and provide a safer solution to face the flood. The connection system is particularly relevant for modules comprising panels or rigid supports in more than one spatial plane, for example a lying one and a standing one shaped similarly to an "L", because the joint connecting the spatial planes is prone to seepage yet difficult to seal and the capability to adjust the membrane relative to the panel or support member without severing their connection allows for a faster and more effective method of sealing than offered by existing connection systems.

There is a need for a connection system between flood barrier modules which is faster, safe, intuitive and more ergonomic to handle.

SUMMARY OF THE INVENTION

It is an object of the invention to provide a connection system which is in at least some aspect improved with respect to prior art systems. In particular, it is an object to provide a connection system for connecting flood barrier modules which is faster, safe, intuitive and more ergonomic to handle. Another object is to provide an improved method for connecting two modules. Yet another object is to provide a flood barrier system.

At least one of the objects is achieved by means of the connection system for connecting at least one membrane to at least one rigid support.

The connection system comprises:
- at least one clamping member,
- at least one locking unit configured for attaching the at least one clamping member to the rigid support, thereby clamping a portion of the at least one membrane between the
- at least one clamping member and the rigid support so as to achieve a sealing between the at least one membrane and the rigid support,
- wherein the at least one locking unit is a discrete state locking unit movable between several specific and distinguishable predetermined locking unit states, each locking unit state corresponding to a connection system stage, the predetermined locking unit states including:
  - an Open locking unit state in which the locking unit is configured to provide a gap between the clamping member and the rigid support, allowing the portion of the at least one membrane to be inserted between the clamping member and the rigid support, the Open locking unit state corresponding to an Open stage of the connection system,
  - Closed locking unit state in which the locking unit is configured to press the clamping member toward the rigid support so that the at least one membrane is clamped between the clamping member and the rigid support, the Closed locking unit state corresponding to a Closed stage of the connection system in which a sealing is provided between the at least one membrane and the rigid support, and
  - a specific and distinguishable Intermediate locking unit state between the Open locking unit state and the Closed locking unit state, in which Intermediate state the at least one membrane is allowed to slide with respect to the clamping member without disengaging therefrom, corresponding to an Adjustment stage of the connection system.

Since the locking units are discrete state locking units, well-defined and discrete, or distinct, states are provided, thus making it easy to connect the membrane to the rigid support even without specific training and experience. The Open locking unit state, the Closed locking unit state and the Intermediate locking unit state are all discrete, or distinct, states defined by the physical geometry and the rotational position of the locking unit. Since each state of the discrete state locking unit is well defined and easily recognizable, transitioning between them, such as via smooth transition surfaces provided on the locking unit, is fast and intuitive. Problems associated with continuous fastening mechanisms such as screws are thereby avoided, for example tightening the screws too much or too little. As a result, the installation process is much facilitated, and the final quality of the connections is improved. Thanks to the three predetermined locking unit states, the connection system allows secure fastening and facilitates adjustment of the membrane to be clamped during a mounting procedure. Another way to describe the discrete, or distinct, states of the locking unit is that transitional states between the discrete/distinct states are not stable. That is, a slight force applied to the lever body of the locking unit or the handle when in a transitional state will bring the locking unit into a discrete/distinct locking unit state.

The predetermined locking unit states may be obtained by rotating the lever body with respect to the lever base around a lever body axis of rotation between three predefined discrete positions.

The clamping member and the locking unit may be separate components, which may be assembled when mounted to the rigid support. In this case, the clamping member and the locking unit are not permanently attached to one another. The clamping member and the locking unit may also be fixedly connected to one another.

To allow adjustment of the membrane in the Intermediate locking unit state, corresponding to the Adjustment stage, the portion of the at least one membrane may comprise at least one stopping portion, the stopping portion being thicker than the membrane. Such a thicker stopping portion facilitates engagement by the clamping member when the locking unit is in its Intermediate locking unit state. Thus, the clamping member may be configured to retain a thicker portion of the membrane in the Intermediate locking unit state, such as by the clamping member being provided with an edge region protruding towards the membrane, a gap between the edge region and the rigid support being smaller than a thickness of the stopping portion, while providing a space inside of the edge region in which the stopping portion may be received.

Optionally, the at least one clamping member is at least one elongated clamping profile. The at least one membrane is allowed to slide along the elongated clamping profile without disengaging therefrom in the Intermediate locking unit state. For this purpose, the clamping profile may have contact portions in the form of parallel longitudinal edges extending along the elongated clamping profile, which protrude towards the rigid support, and a receiving portion between them. The receiving portion is herein arranged so that a space is provided between the receiving portion and the rigid support. A thicker stopping portion of the membrane may thus be received under the receiving portion. The connection system preferably comprises a plurality of locking units arranged spaced apart along the at least one elongated clamping profile.

Preferably, in the Closed locking unit state corresponding to the Closed stage of the connection system, the clamped areas of the membrane are prevented or substantially prevented from moving with respect to the clamping member, while other areas of the membrane can bend and flex as is typical of a membrane. The friction applied in the Closed locking unit state prevents movement as well as provides sealing.

The sealing achieved in the Closed stage may preferably be a water-tight or an essentially water-tight sealing. A bit of leakage may be acceptable, but if the connection system is used in a flood barrier module system, it should be able to withstand pressure applied thereon by water masses without allowing substantial amounts of water to flow through the sealing.

The connection system may be used for connecting a membrane to a rigid support, to which the locking unit is anchored and fixes the elongated clamping profile. The rigid support may for example be a panel, such as a panel comprising a wood plate or composites plates, or a metal plate. The rigid element may be covered or enveloped with various flexible materials, textile, paint etc.

The membrane is herein to be understood as a thin pliable sheet of material, such as a textile sheet, e.g. a water-proof woven sheet, a non-woven sheet, a canvas, a plastic sheet, or similar, depending on the application. The membrane may for example be a water-impermeable membrane if a water-tight sealing is aimed at.

Optionally, the locking unit further comprises a locking means for locking the locking unit in the Closed locking unit state. This may also be seen as a Locked locking unit state. The locking means may be configured so that only an intentional human actuation will enable unlocking of the locking means, such as by first applying a first force in a first direction and subsequently applying a second force in a second direction, different from the first direction. This will also be further described in the following.

Optionally, the locking unit further comprises a handle, wherein actuation of the handle enables the rotation of the lever body around its axis of rotation. The locking unit is thereby easy to actuate. The handle may be L-shaped with an internal segment extending within a hole provided in the lever body, and an external segment extending outside of the lever body. Optionally, the locking unit further comprises a lifting spring configured to press the lever body away from the rigid support.

Optionally, the lifting spring is configured for pressing the clamping member toward the lever body at least in the closed locking unit state.

Optionally, the lifting spring is further configured for pressing the clamping member toward the lever body in the intermediate locking unit state. The lifting spring may in this case be used to define and/or stabilize the intermediate locking unit state, optionally in combination with a flat surface region of the lever body. In particular, the lifting spring ensures that a fixed distance is provided between the clamping member and the rigid support in the intermediate locking unit state, facilitating adjustment of the membrane between the clamping member and the rigid support.

Optionally, the lifting spring is further configured for pressing the clamping member toward the lever body in the open state. This ensures that a fixed distance is provided between the clamping member and the rigid support in the open state, facilitating insertion of the membrane between the clamping member and the rigid support.

Optionally, the locking unit further comprises a calibration bolt for adjusting the predefined positions of the lever body.

Optionally, the handle is rotatable around a handle axis of rotation, enabling the locking unit to assume a Locked locking unit state. The handle axis of rotation may in some embodiments be parallel with the lever body axis of rotation.

Optionally, the Locked locking unit state is assumable by rotation of the handle around the handle axis of rotation from the Closed locking unit state to the Locked locking unit state. Thus, the handle may be movable between an actuating position in which it is usable for the rotation of the lever body with respect to the lever base, and a locking position in which it prevents the lever body from rotating with respect to the lever base in at least the closed locking unit state. The handle may hereby be configured so that only an intentional human actuation will enable unlocking, such as by first pulling on the handle in one direction and thereafter rotating it by applying a force in a different direction than the direction used to pull on the handle.

Optionally, the lever body comprises a first groove in which at least a portion of the handle is received in the actuating position, and a second groove in which at least a portion of the handle is received in the locking position, said first and second grooves preventing unintentional rotation of the handle with respect to the main body.

Optionally, the lever body further comprises a handle spring for retaining the handle in the actuating position and the locking position, respectively. This ensures that the handle is not accidentally moved to from one position to the other. It thereby also facilitates handling of the locking unit in the actuating position, i.e. in the Locked locking unit state.

Optionally, the clamping member comprises sealing and/or closing improvement means, such as at least one reciprocating extension and/or at least one elastomer gasket and/or at least one elastomer layer. It is also possible to provide a membrane or a rigid support including such sealing and/or closing improvement means, in case the clamping member does not necessarily need to be equipped with such means.

Optionally, the connection system further comprises the rigid support, wherein the connection system is configured for connecting at least two membranes extending on opposite sides of the rigid support. In this way, the connection system may be used for connecting two neighbouring membranes on either side of the connection system and its rigid support.

In this way, the connection system may be used for connecting two neighbouring rigid supports or rigid support modules by detachable membranes extended in-between. Portions of both membranes may be clamped under the same elongated clamping profile(s).

Optionally, the at least one elongated clamping profile comprises a first elongated clamping profile and a second elongated clamping profile, the first elongated clamping profile extending at an angle with respect to the second elongated clamping profile. The two elongated clamping profiles may e.g. be arranged at an angle of at least 60°, or at least 75°, or at least 80° with respect to one another. Preferably, when the connection system is used in a flood barrier system, the two elongated clamping profiles extends essentially perpendicularly to one another, so that one extends in a horizontal direction and the other one in a vertical direction.

Optionally, the connection system further includes an intra-module eccentric latch provided on the second elongated clamping profile, the intra-module eccentric latch being configured to press an underlying membrane portion toward a rigid support and/or the first elongated clamping profile extending at an angle with respect to the second elongated clamping profile. The connection system may further comprise an encapsulating member, such as a plastic member, provided on an end of the second elongated clamping profile that faces the first elongated clamping profile, which encapsulating member is configured to encapsulate a membrane termination and push it into a substantial 90° angle that reciprocates a corner between the first and second elongated clamping profiles. The intra-module eccentric latch, optionally in combination with the encapsulating member, improves the sealing in a corner region between two rigid support members hinged together by at least one hinge member, such as a hinge membrane or mechanical hinges in the form of e.g. metal hinges. The intra-module eccentric latch used in combination with the elongated clamping profiles and locking units of the connection system enables a one-directional compression of the membrane, thus requiring less force to compress the membrane and achieve efficient sealing. As an alternative, the intra-module eccentric latch may be provided on the first elongated clamping profile.

The second elongated clamping profile may optionally extend in a horizontal or essentially horizontal plane, and the first elongated clamping profile extend in a vertical or essentially vertical plane, or vice versa. The underlying rigid supports extend in the same direction as the respective elongated clamping profiles.

Optionally, the locking unit comprises a calibration member for adjusting the predetermined locking unit states. The calibration member may e.g. be a calibration bolt, screw or other suitable member. The locking unit may thereby be adapted for e.g. membranes of different thicknesses.

According to another aspect, a method for connecting two modules using the proposed connection system is provided, wherein at least one of the modules comprises the at least one membrane, the method comprising the steps of:
  a. positioning the modules side-by-side,
  b. setting the at least one locking unit in the Open locking unit state such that the connection system assumes the Open stage,
  c. inserting the portion of the at least one membrane between the at least one clamping member and the rigid support,
  d. moving the at least one locking unit to the Intermediate locking unit state such that the connection system assumes the adjustment stage,
  e. optionally adjusting the at least one membrane relative to the rigid support,
  f. moving the at least one locking unit to the Closed locking unit state.

Optionally, when the connection system further includes an intra-module eccentric latch provided on the clamping member in the form of the second elongated clamping profile, the method further comprises tightening the eccentric latch to press it towards the vertical plane, optionally so that an optional encapsulating member, provided on an end of the second elongated clamping profile that faces the second elongated clamping profile, encapsulates a membrane termination and pushes it into a substantial 90° angle that reciprocates a corner between the first and second elongated clamping profiles. This is carried out with the locking unit in the Intermediate locking unit state, i.e. in the adjustment stage of the connection system. By means of the intra-module eccentric latch and the optional encapsulating member, efficient sealing in a corner region between an essentially horizontal and an essentially vertical rigid support, or between rigid supports extending at other angles with respect to one another, can be achieved by means of sequential compression first in the vertical direction, and thereafter in the horizontal direction. Sealing in the corner region between two rigid support members may otherwise be difficult to achieve since the required two-directional force application, involving sequential application of forces in a first and second direction, ideally perpendicular on the planes intersected by the corner, is non-trivial to create. By the Intermediate locking unit state and the adjustment stage according to the present invention, it is ensured that the end portion of the membrane does not slip out from its position under the horizontal elongated clamping profile while pressing the membrane toward the vertically extending rigid support. The encapsulating member has the combined function of protecting the membrane from being accidentally perforated by the elongated clamping profile towards which it is pressed, and to improve clamping and sealing by reciprocating the membrane termination, which may be a thickened end portion.

The advantage with one-directional compression is that it can easily be divided into smaller modules, e.g. instead of compressing very heavily through one giant lever, several smaller levers may be used, each requiring a smaller force.

This concept is difficult to combine with a two-directional force that is applied in one sequence.

According to another aspect, a flood barrier module system comprising at least two modules which are mutually connected by the proposed connection system is provided, at least one of the at least two modules comprising a membrane. A portion of the membrane is engaged in the connection system, thus ensuring sealing. Each module preferably comprises a first rigid panel and a second rigid panel extending at an angle with respect to one another, such as at an angle of at least 60°, or at least 75°, or at least 80° with respect to one another, preferably perpendicularly or essentially perpendicularly with respect to one another. To each panel, at least one membrane may be attached, so that e.g. the membrane(s) of a first module is connected to the rigid panel(s) of a second, adjacent module. The flood barrier module system preferably comprises a plurality of modules connected together.

Optionally, the portion of the at least one membrane comprises at least one stopping portion, the stopping portion being thicker than the membrane. Such a thicker stopping portion facilitates engagement by the elongated clamping profile when the locking unit is in its Intermediate locking unit state.

Optionally, the at least one stopping portion is an elongated portion extending in parallel with the elongated clamping profile.

Optionally, the at least one stopping portion is a keder.

Optionally, the portion of the at least one membrane is an end portion of the membrane.

Optionally, at least one of the at least two mutually connected modules comprises a panel, wherein the panel forms the rigid support to which the at least one elongated clamping profile is attached by means of the at least one locking unit.

Optionally, the flood barrier module system further includes an eccentric latch configured to reinforce the connection between two adjacent horizontal panels of the at least two modules.

Optionally, the two modules comprise the proposed connection system on their side facing each other, and a loose membrane can be engaged at each of its sides to each module at the connection system. Such system allows to store and engage separately modules and connection membranes.

According to another aspect, a locking unit is provided. The locking unit as described below may form part of the proposed connection system, but it may also be used on its own for different purposes. If used for different purposes, the locking unit may be used with other types of clamping members than the elongated clamping profile described above, or no clamping member at all. It may also be used for any other closing, locking, positioning, or fastening application, in particular where intermediate or locking states of the kind described herein are of interest. The locking unit may in some applications be used without a separate clamping member, for example if a surface of the locking unit itself is configured as a clamping surface. The locking unit may also comprise a clamping member of any kind, with respect to which the locking unit is rotatable. It may also be used for any other closing, locking, positioning, or fastening application, in particular where intermediate or locking states of the kind described herein are of interest. As an example, such a locking unit may form part of a connection system, with a rigid support system or not, used to connect membranes protecting assets or areas from wind and rain in a tent-like structure. It may also be used for a closed pool, buffering an overflow such as may be useful for industrial or urban use in fence like structures, e.g. surrounding a construction site by extending robust membranes/plates between pillars/poles, or to create a pool to capture rain water. Alternatively such a connection system may be used to erect and maintain a sail on a boat, or be used as a sun screen resistant to wind, or be used as a separable hinge for connecting support members.

The locking unit is a discrete state locking unit movable between at least three predetermined locking unit states, the states being defined by the physical geometry and rotational position of the discrete state locking unit, the locking unit including a lever body with an axis of rotation, the locking unit being configured to be anchored on a support and engage with a clamping part positioned between the locking unit and the support, wherein the predetermined locking unit states comprise:

an Open locking unit state providing a predefined larger distance between the lever body and the support, a Closed locking unit state providing a predefined smaller distance between the lever body and the support, an Intermediate state providing an intermediary distance between the lever body and the support, that facilitates repositioning of the objects being connected without them being able to disengage, and wherein the at least three different states are obtained by rotating the lever body around its axis of rotation between predefined positions.

Optionally, the lever body is rotatable between at least two discrete predefined positions corresponding to the Open locking unit state and the Closed locking unit state, respectively. Also a third discrete predefined position corresponding to the Intermediate locking unit state, may be provided.

Embodiments of the locking unit are described above.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings:

FIG. 5 is a front view of a connection system according to another embodiment.

Figure 1A:
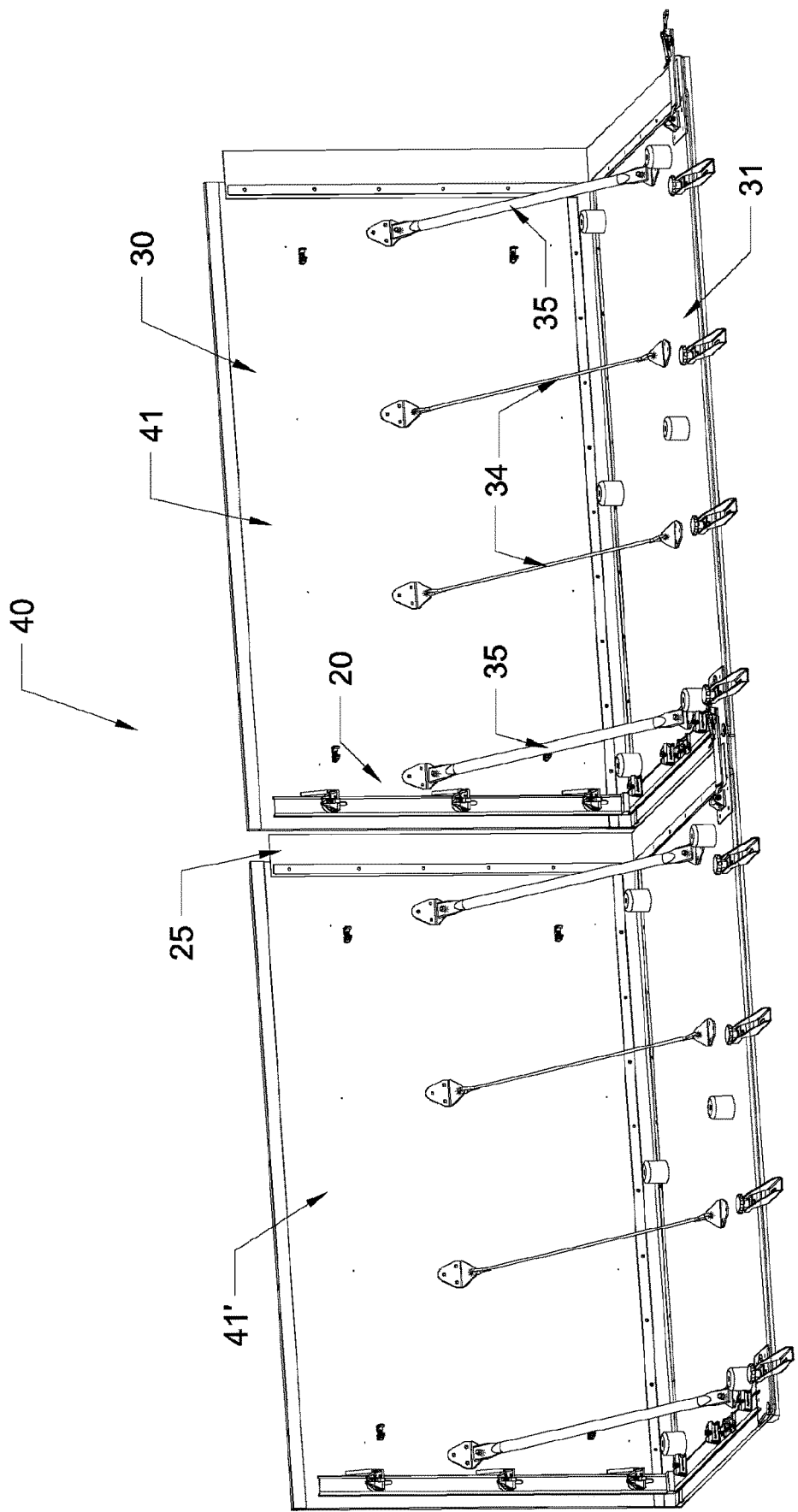
FIGS. 1a and b are perspective views of flood barrier modules at different scale according to an embodiment of the invention, FIGS. 2a, b, c and d are front views of a connection system according to an embodiment of the invention, respectively in open, adjustment, closed, and locked stages.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like

DETAILED DESCRIPTION OF EXAMPLE EMBODIMENTS OF THE INVENTION

Figure 1B:
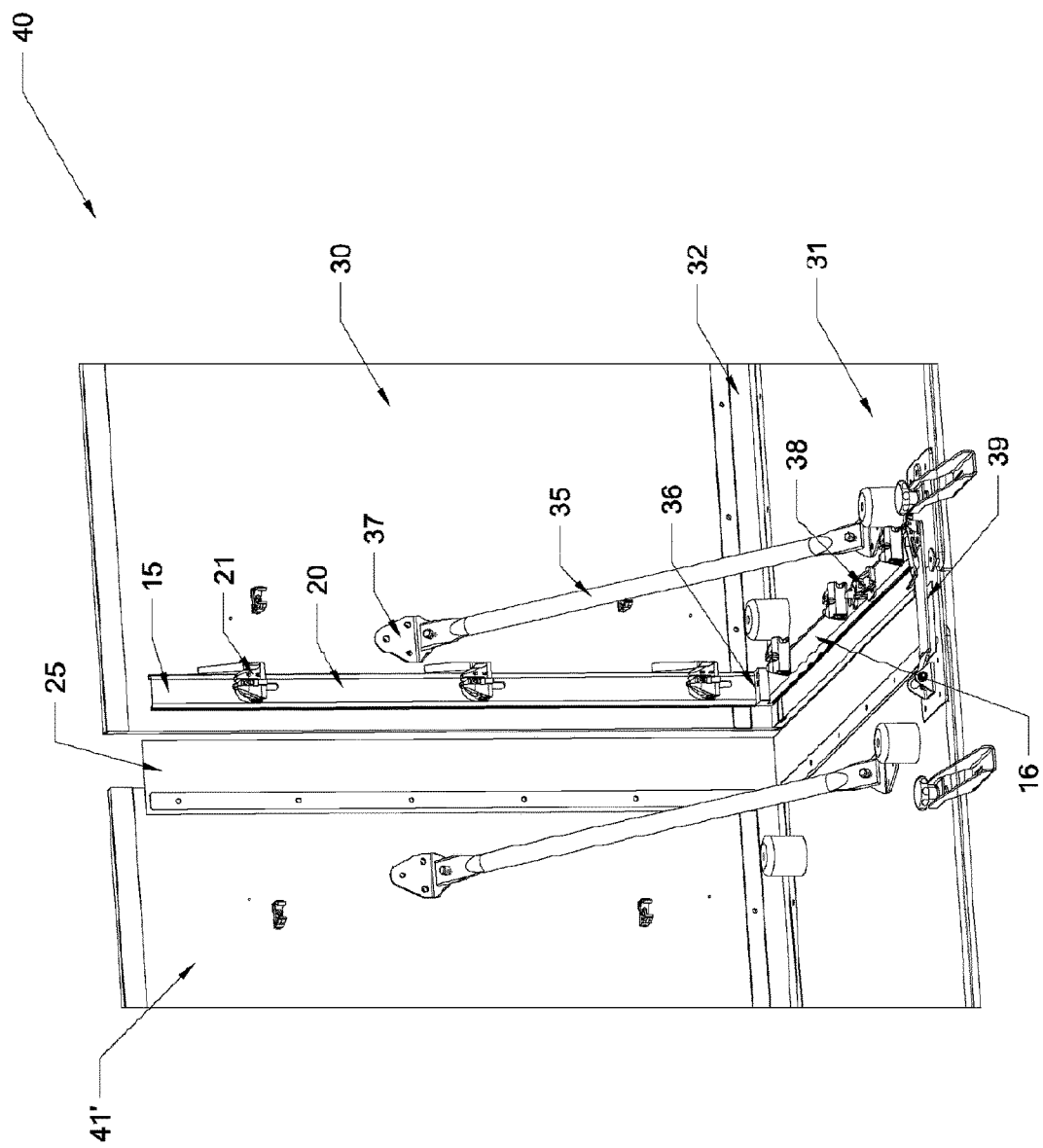

A flood barrier module system 40 according to an embodiment of the invention is shown in FIG. 1. The flood barrier module system comprises two identical modules 41, 41' each module comprising two panels 30, 31 connected in an L shape with one vertically extending vertical panel 30 and one horizontally extending horizontal panel 31. The vertical panel 30 is connected to the horizontal panel 31 by means of a membrane extending along a bottom peripheral edge of the vertical panel 30, thus constituting a hinge 32. Between the vertical and horizontal panels 30, 31, on a side of the module 41 which is intended to be a flooded side, run wires 34 and struts 35 connected by brackets 37 attached on both panels 30, 31.

The struts 35 can be disconnected from the vertical panel 30 so that it can be folded onto the horizontal panel 31, making it suitable for easier transport and storage. The wires 34 are permanently attached to both panels 30, 31 and prevent the vertical panel 30 from folding backwards, i.e. away from the flooded side and the horizontal panel 31. Struts serve two purposes, keeping the vertical panel 30 standing when waiting for the flood, and preventing it from folding when not intended, e.g. due to heavy winds.

The modules 41, 41' are configured to be interconnected by a membrane 25 to provide flexibility between the modules 41, 41'. By means of this membrane 25, a series of modules can turn left and right as well as up and down, to navigate around obstacles and to follow elevations in the terrain. On the right-hand side, as seen from the flooded side of each module 41, 41', the membrane 25 is permanently affixed, and on the left-hand side of the module 41, 41', a connection system 20 according to an embodiment of the invention is provided, allowing the membrane 25 of a neighbouring module 41, 41' to be releasably and securely fastened—in this case the membrane 25 of the module 41' is to be fastened to the connection system 20 provided on the module 41.

The connection system 20 comprises two elongated clamping profiles 15, 16, of which a first elongated clamping profile 15 is mounted on the vertical panel 30 and a second elongated clamping profile 16 is mounted on the horizontal panel 31. The panels 30, 31 in this embodiment form rigid supports. Each clamping profile 15, 16 is mounted to the respective panel by means of a plurality of locking units 21.

The connection system 20 is shown in greater detail in FIGS. 2a-3d, herein with a separate rigid support 50 instead of the panels 30, 31. The locking unit 21 is a discrete state locking unit movable between several predetermined locking unit states, each locking unit state corresponding to a connection system stage. The locking unit 21 comprises connection bolts 9 for attaching it to the rigid support 50, a handle 1 for moving it between the predetermined states, and a lever body 2. The locking unit 21 will also be further described below with reference to FIGS. 4 and 6.

The connection system stages include an Open stage, in which the membrane 25 may be inserted under the clamping profile 15, a Closed stage in which the membrane 25 is securely fastened, and an Adjustment stage in which the membrane 25 is slidable under the elongated clamping profile 15 while prevented from disengaging. The elongated clamping profile 15 comprises a first contact portion 17 and a second contact portion 18, both configured to press against the rigid support 50. A receiving portion 19 extend between the contact portions 17, 18, a space being provided between the receiving portion 19 and the rigid support 50. The membrane 25 of this embodiment comprises a keder 26 at an end portion of the membrane 25, which keder is adapted to fit between the receiving portion 19 and the rigid support 50.

Figure 2A:
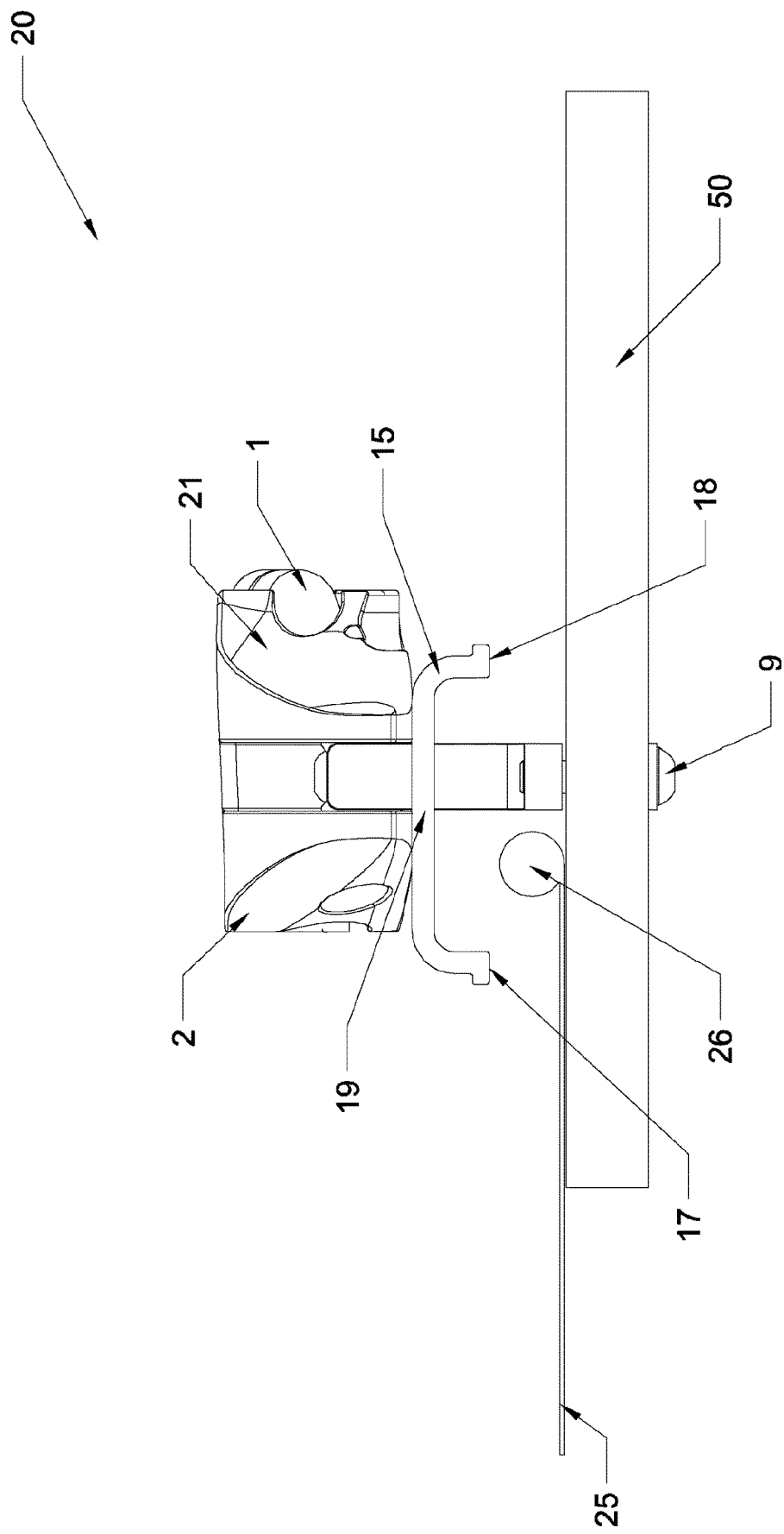
Figure 3A:
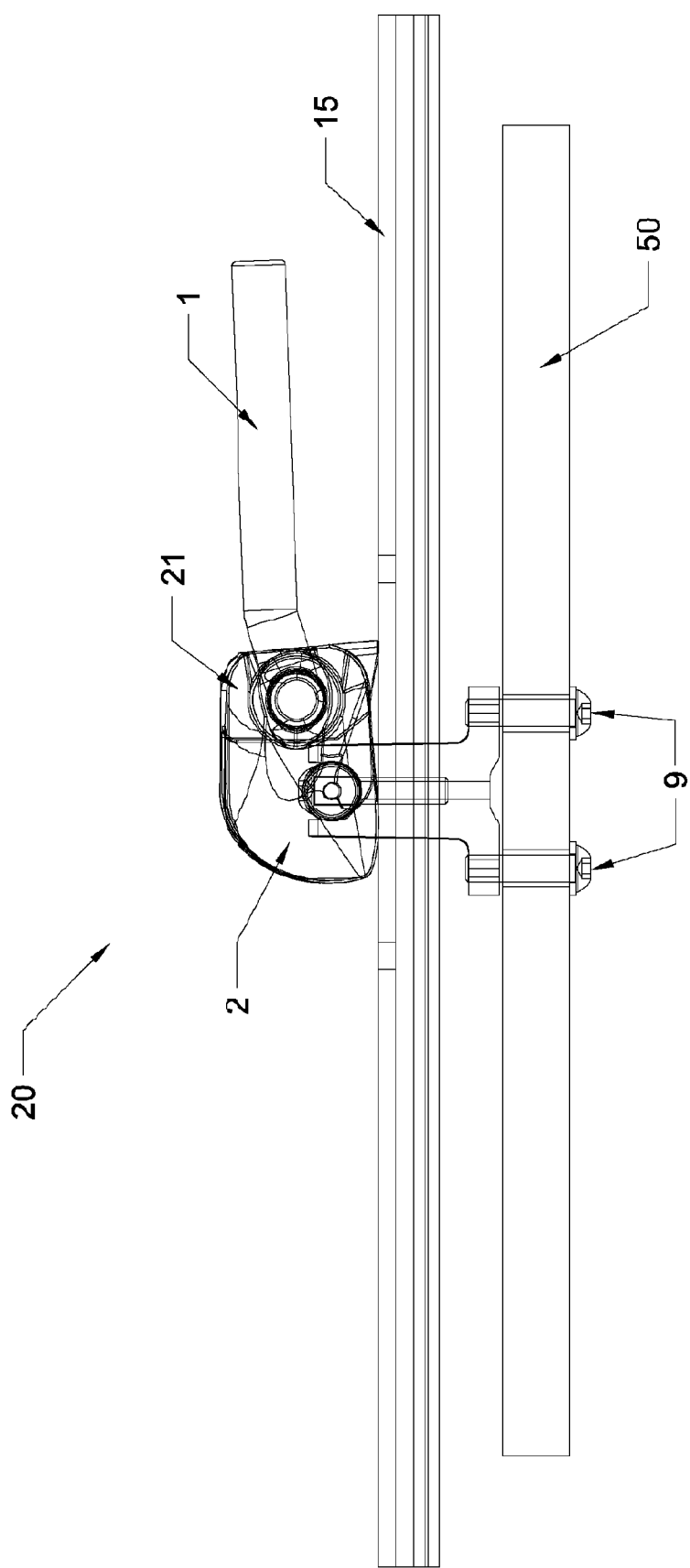
FIGS. 3a, b, c and d are side views of the connection system in FIGS. 2a, b, c, and d, respectively.
Figure 4:
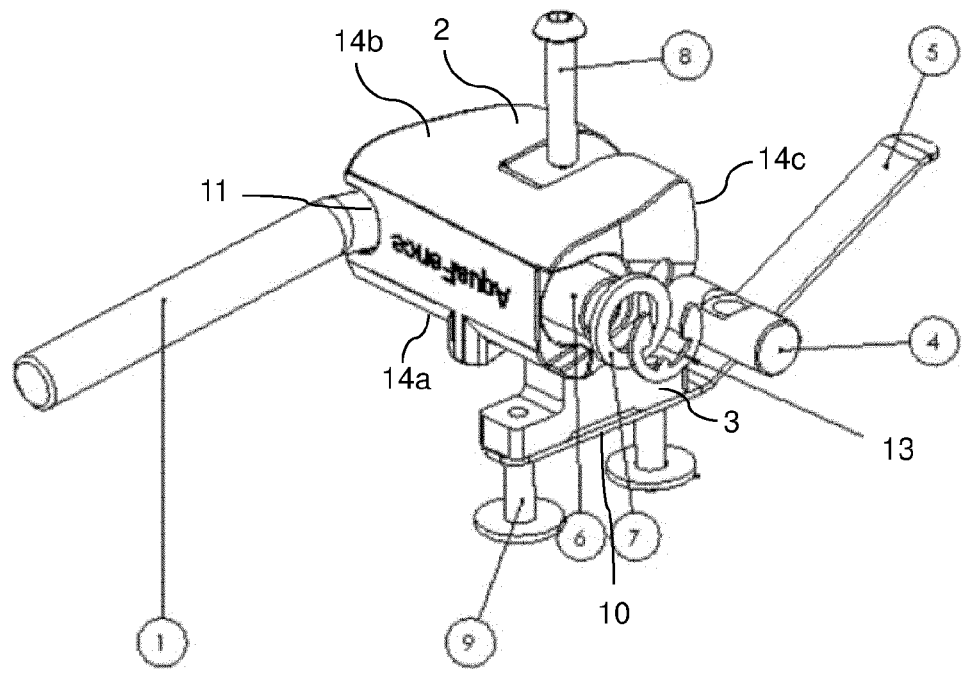
FIG. 4 is a perspective and partly exploded view of a locking unit used in the connection system shown in FIGS. 1-3.

FIGS. 2a and 3a show the connection system 20 in an Open stage, with the locking unit 21 in an Open locking unit state. Reference is also made to FIG. 4, showing the locking unit 21 in further detail. When the locking unit 21 is in the Open locking unit state, a lifting spring 5 pushes the elongated clamping profile 15 away from the support, thus pushing the connection system 20 into the Open stage. In the Open locking unit state, a predefined first gap is provided between the rigid support 50 and the contact portions 17, 18, which predefined first gap is larger than a thickness of the keder 26. The keder may thus be inserted under the elongated clamping profile 15. A predetermined open state distance is provided between the lever body 2 and a contact surface 10 of the lever base 3. The lever body 2 is fixed against the elongated clamping profile 15 by means of the configuration of the contact regions provided between the lever body 2 and the elongated clamping profile 15, and by the pressure from the lifting spring 5 acting on the clamping profile 15.

Figure 2B:
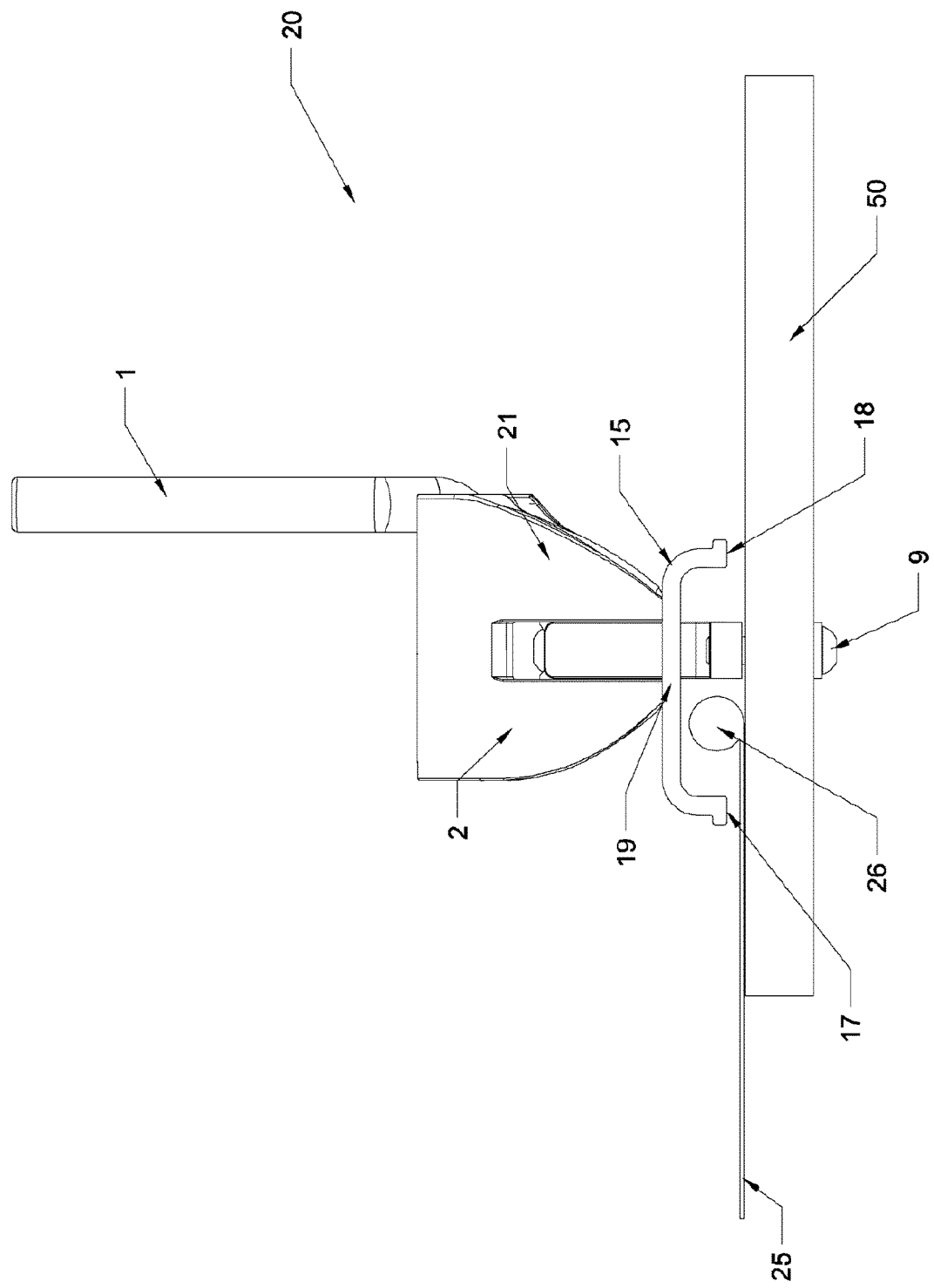
Figure 3B:
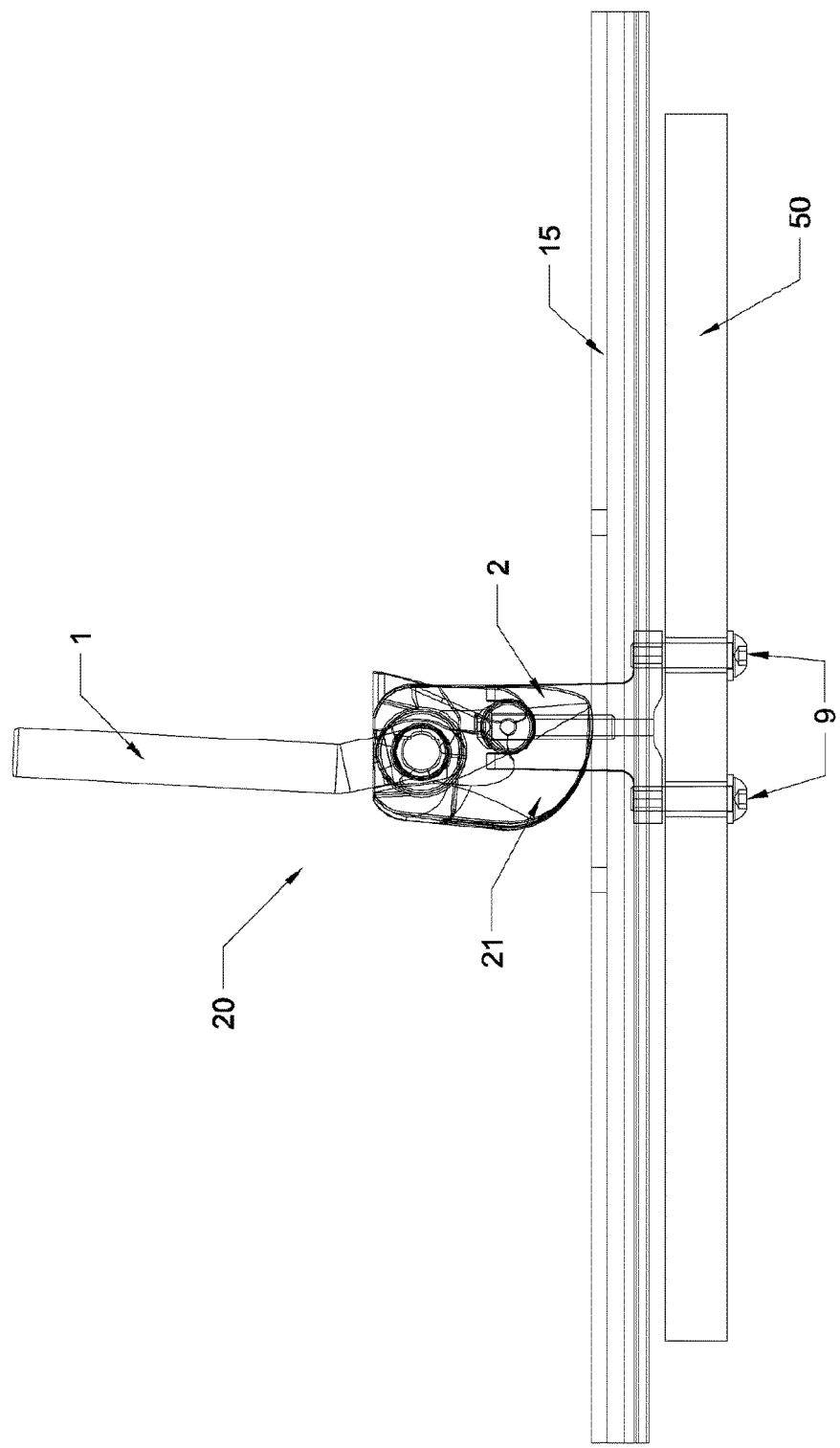

FIGS. 2b and 3b show the connection system 20 in an Adjustment stage, with the locking unit 21 in an Intermediate locking unit state. In this stage, a predefined second gap is provided between the rigid support 50 and the contact portions 17, 18, which predefined first gap is smaller than a thickness of the keder 26. The membrane 25 may thus be moved along the elongated clamping profile 15, but it may not be removed therefrom by pulling on it in any other direction. A predetermined intermediate state distance is provided between the lever body 2 and the contact surface 10 of the lever base 3. The Intermediate locking unit state is assumed by, from the Open locking unit state, rotating the handle 1 and thereby the main body 2, approximately 90° from the Open locking unit state around an axle 4. With the axle 4 extending in parallel with the rigid support 50, the handle 1 is directed away from the rigid support 50. The lifting spring 5 presses the elongated clamping profile 15 toward the lever body 2 so that the locking unit 21 is retained in the Intermediate locking unit state. In the absence of such Intermediate locking unit state where the membrane 25 is engaged, adjusting the membrane may cause repeated and time-consuming disengagements of the membrane from the clamping members. In that case, the membrane would need to be manipulated again and reinserted under the clamping member, and adjustment at the hinge may also need to be redone.

Figure 2C:
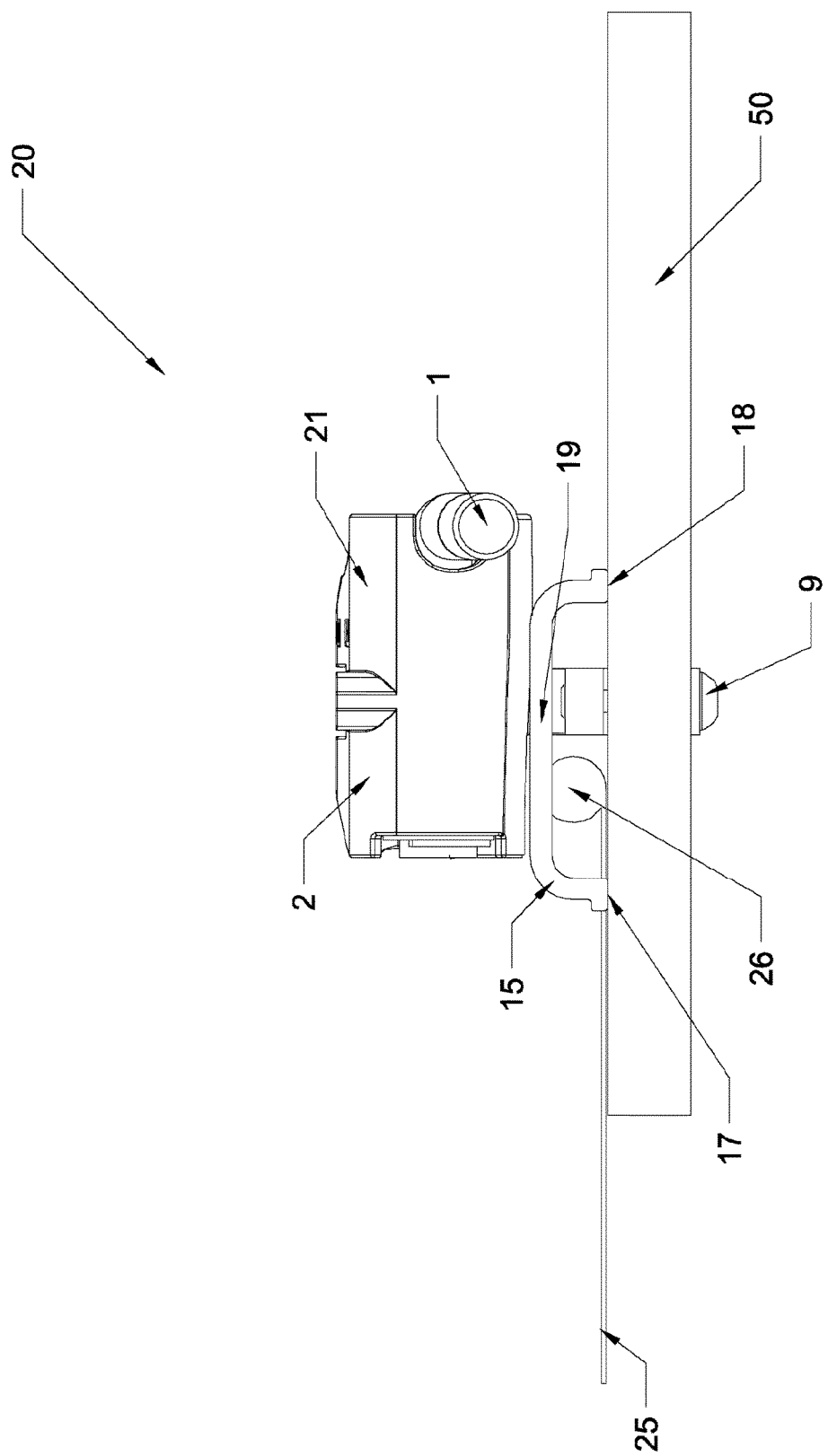
Figure 3C:
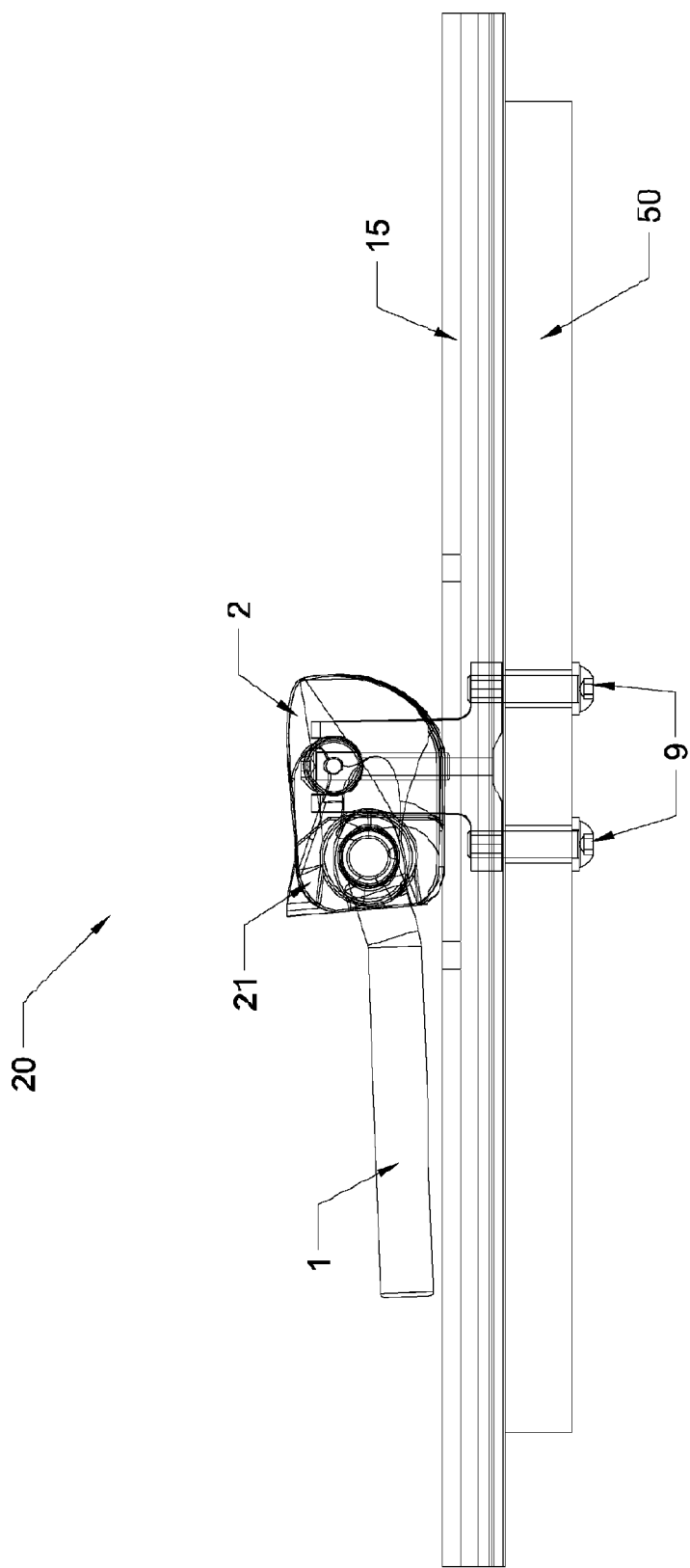

FIGS. 2c and 3c show the connection system 20 in a Closed stage, with the locking unit 21 in a Closed locking unit state. In this stage, the locking unit 21 presses the contact portions 17, 18 toward the rigid support 50, so that the membrane 25 is clamped between the rigid support 50 and the first contact portion 17. A sealing is thereby provided. The closed state of the locking unit 21 is assumed by rotating the handle 1 and the lever body 2 approximately 90° further about the axle 4, so that the handle 1 in the Closed locking unit state is rotated approximately 180° with respect to the Open locking unit state. A predetermined closed state distance is provided between the main body 2 and the contact surface 10 of the base part 3.

Figure 2D:
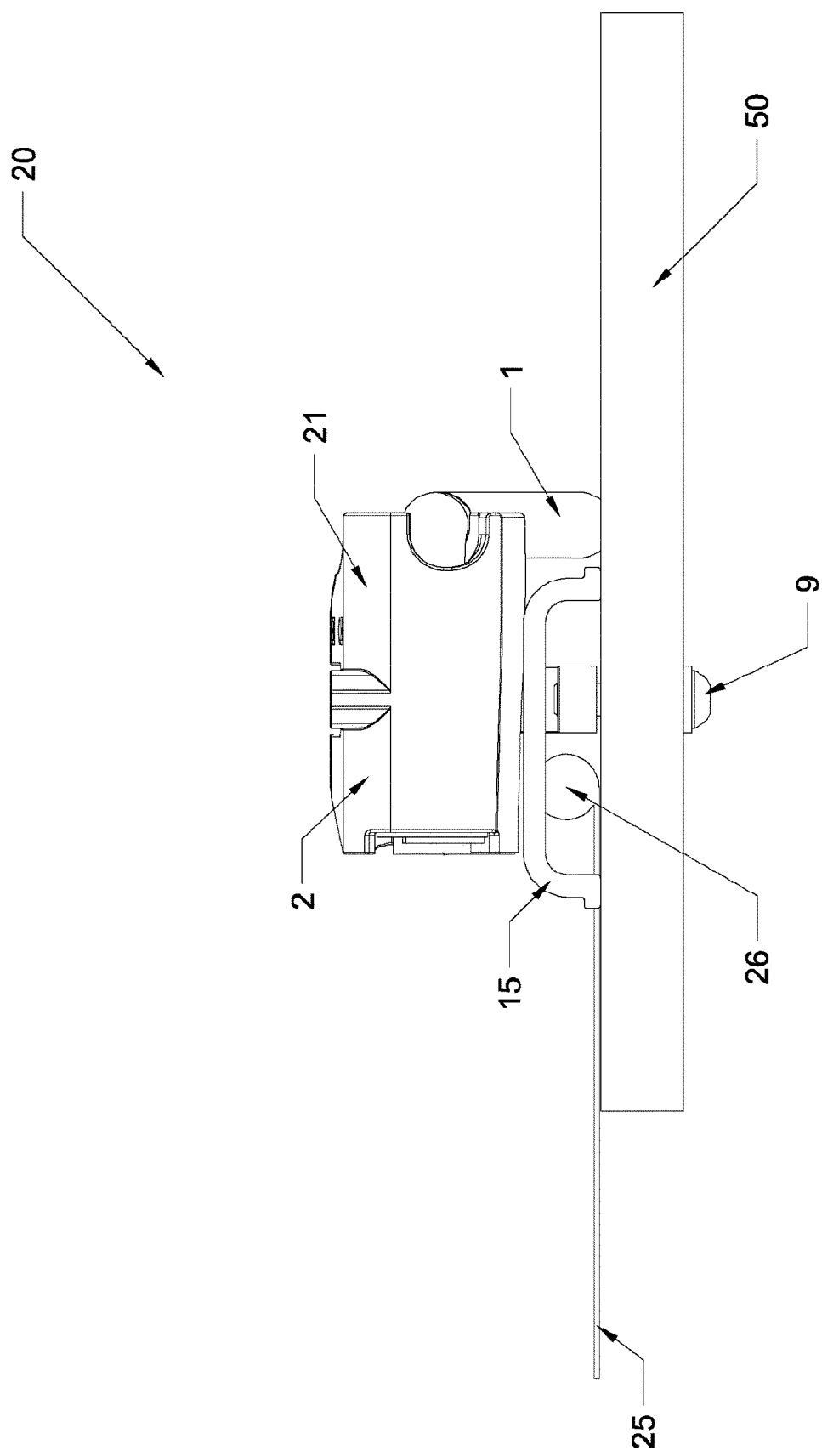
Figure 3D:
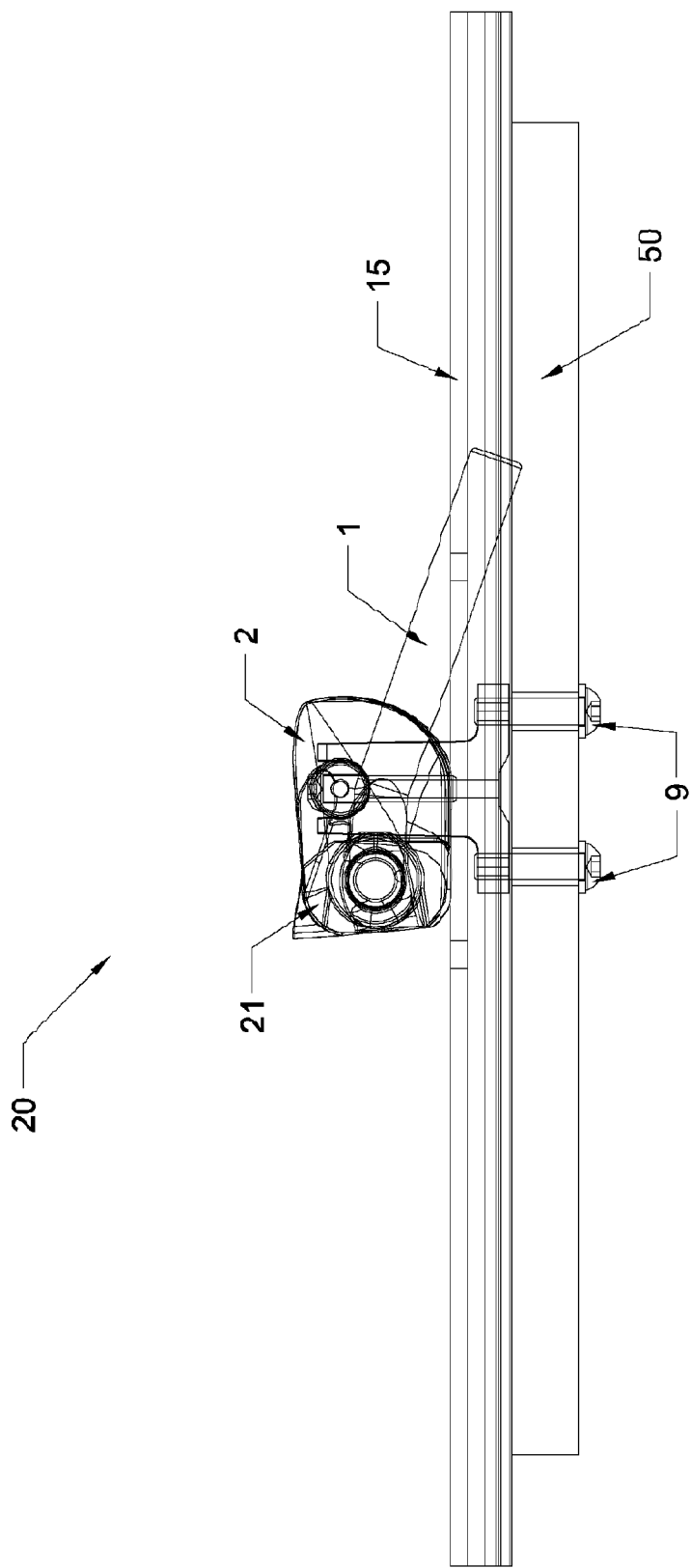

FIGS. 2d and 3d show the connection system 20 in a Locked stage, with the locking unit 21 in a Locked locking unit state. In this stage, the locking unit 21 presses the contact portions 17, 18 toward the rigid support 50 just like in the Closed locking unit state. However, in this state, the locking unit 21 is locked so that only an intentional human actuation will enable unlocking. The Locked locking unit state is assumed by rotation of the handle 1 relative to the lever body 2 as will be further described below with reference to FIGS. 4 and 6.

When the connection system 20 is in the Adjustment stage and the keder 26 is retained inside the elongated clamping profile 15 of the horizontal panel 31, an optional intra-module eccentric latch 38 atop the elongated clamping profile 15 installed on the horizontal panel 31 (see FIG. 1b) may be used to push the profile 15 towards the hinge 32 provided between the vertical and horizontal panels 30, 31. The connection system 20 thereby creates a sustainable 90° angle in the hinge 32, so as to achieve improved water-sealing performance, in particular in the corner region between two adjacent modules 41, 41'. To avoid any damage to the membrane 25 and keder 26 of the membrane 25, and to improve the sealing performance, an encapsulating member 36 with a U-profile is permanently affixed onto the edge of the horizontal elongated clamping profile 15.

Without an Intermediate locking unit state as described herein, the actuation of such an intra-module eccentric latch 38 may push a membrane termination towards the hinge/corner between the rigid support panels, and simultaneously disengage it partly from the clamping member(s) further away from the hinge, after which the membrane is strained by the compression towards the hinge. The membrane would thus be difficult to reposition without disengaging the intra-module eccentric latch.

A method for connecting two modules 41, 41' using the connection system 20 comprises the steps:
 a. positioning the modules 41, 41' side-by-side,
 b. setting the locking units 21 in the Open locking unit state such that the connection system 20 assumes the Open stage,
 c. inserting the portion of the membrane 25 including the keder 26 between the elongated clamping profiles 15, 16 and the rigid support 50 or the panels 30, 31,
 d. moving the at least one locking unit 21 to the Intermediate locking unit state such that the connection system 20 assumes the Adjustment stage,
 e. optionally adjusting the membrane 25 relative to the rigid support 50 or the panels 30, 31,
 f. moving the at least one locking unit 21 to the Closed locking unit state.

Optionally, the at least one locking unit 21 may thereby be positioned in the Locked locking unit state by use of locking means. Another step may be to tighten the optional eccentric latch 38 to press it towards the vertical plane so that an optional encapsulating member 36 encapsulates the membrane termination and pushes it into a substantial 90° angle that reciprocates a corner between the first and second elongated clamping profiles 15, 16. Another optional step is to take an inter-module eccentric latch 39 on a front edge of the membrane-receiving module 41, connect it to the membrane-giving module 41' and tighten it so that gaskets underneath the modules 41, 41' are connected.

The method may be performed by first horizontally adjusting the membrane 25 before setting the locking units 21 of the horizontal panel 31 to the Closed locking unit state. Only thereafter, the membrane 25 is adjusted in the vertical direction and the locking units 21 of the vertical panel 30 are subsequently set to the Closed locking unit position.

The method may also be performed by first inserting the membrane 25 under both elongated clamping profiles 15, 16, thereafter move all locking units 21 of elongated clamping profiles 15, 16 to their Intermediate locking position, then adjust the membrane 25.

The current connection system is served especially well by a discrete state locking unit as will be described in further detail below. Other devices may also be used, preferably if they provide easy-to-operate discrete states, in particular at least one Intermediate state, where the gap between the device and the rigid support 50 is predetermined, and preferably adjustable.

FIG. 5 shows an embodiment of the connection system 20 in which two membranes 25, 25' are clamped by means of the connection system 20. Keders 26, 26' of the respective membranes 25, 25' are inserted on opposite sides of the connection bolts 9, between the elongated clamping profile 15 and the rigid support 50. In this embodiment, the rigid support 50 forms part of the connection system 20.

Reference is now made to FIG. 4, showing a discrete state locking unit 21 according to an embodiment of the invention, herein forming part of the connection system 20. The locking unit 21 comprises a handle 1 and a lever body 2. The locking unit 21 may be maneuvered between several discrete states, as described above with reference to FIGS. 2a-3d, whereby some are defined by the geometry and orientation of the lever body 2, and others by the orientation of the handle 1. The lever body 2 can rotate around an axle 4, defining a lever body axis of rotation A. The axle 4 is mounted on a lever base 3 with a calibration bolt 8, allowing adjustment of a vertical position of the axle 4 relative to the lever base 3, such that the force generated by closing the locking unit 21 can be calibrated. Rotation of the lever body 2 causes a certain displacement relative to the axle 4, acting on a body underneath the lever body 2, defined by the curvature of the lever body 2 geometry, wherein distinct regions serve to define some or all of the states of the locking unit 21. When applied to the connection system 20, the lever body 2 is applied to the elongated clamping profiles 15, 16, although it may in other types of connection systems be applied to other clamping members having a different shape and configuration.

Figure 6:
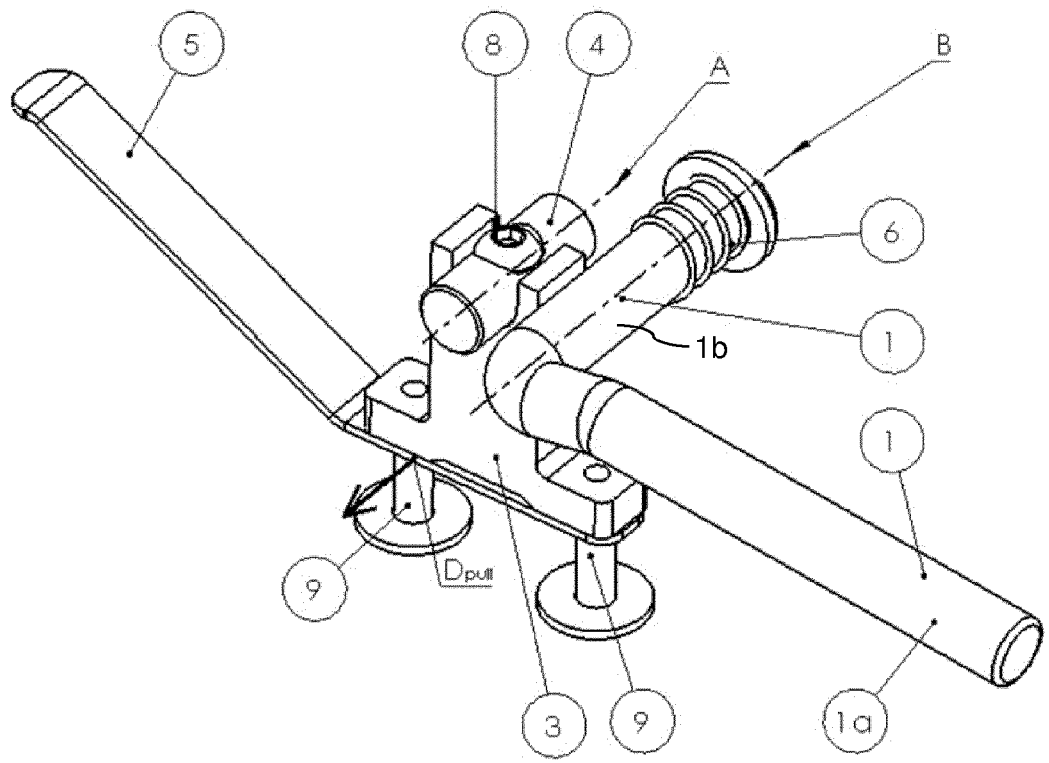
FIG. 6 is a perspective view showing parts of the locking unit in FIG. 4.

Reference is now also made to FIG. 6, showing the locking unit 21 without the main body 2. As shown herein, the handle 1 is substantially L-shaped wherein one external segment 1a is external to the lever body 2 and another internal segment 1b is arranged within the lever body 2, connecting it with the lever body 2 and acting as an axle. Thereby, the handle 1 can be hand-held and rotated relative to the lever body 2, by pulling it axially away from the lever body 2 in a pulling direction $D_{pull}$, out of an actuating position of the handle 1, and rotating it 180° relative to the lever body 2 around an axis of rotation B. The actuating position is defined by a substantial first groove 11 fixing the handle 1 in place relative to the lever body 2. The locking position is defined by a substantial second groove (not shown) in the lever body 2, in which a portion of the handle 1 is retained in the locking position. A handle spring 6 affirms the positions by pulling the handle 1 towards the lever body 2, contrary to the pulling direction $D_{pull}$. Once in the locked position, forces on the handle with any direction tangential on the axis of rotation B will not transition the locking unit 21 from the closed locking unit state to the open locking unit state, because the handle would either collide with the rigid support 50 and stop from further movement, or actuate forces on the lever body 2 in a direction opposite to that of bringing the locking unit 21 to its Open locking unit state, thus preventing it from accidentally opening. This corresponds to the Locked stage described with reference to FIGS. 2d and 3d. Thus, a locking means is hereby provided, locking the locking unit 21 in the Closed locking unit state.

A washer 7 retains the handle spring 6 and protects it when the handle 1 is rotated. A C-ring 13 is further provided for retaining the washer 7 by gripping tightly onto the handle 1 and retaining it in the lever body 2. The C-ring 13 also prevents the handle 1 from being fully removed from the lever body 2 by being retained in the lever body 2.

Underneath the lever base 3, a lifting spring 5 is provided for lifting a component on which the locking unit 21 acts, such as the elongated clamping profile 15 in the connection system 20, in a direction perpendicular to a plane in which the locking unit 21 is mounted, which affirms some or all of the states of the locking unit 21 by forcing the component acted upon into the lever body 2 such that it stabilizes in certain positions, aligned with the states, and is prevented from rotating accidentally. Connection bolts 9 are provided for attaching the locking unit 21 to a support such as the rigid support 50 or the panels 30, 31.

The lever body 2 comprises a first side 14a and an opposite second side 14b, wherein the first side 14a is configured to face the rigid support in the Open locking unit state, and wherein the second side 14b is configured to face the rigid support in the Closed locking unit state. The first side 14a and the second side 14b comprise means for defining the Open locking unit state and the Closed locking unit state, respectively, as discrete states when in contact with a flat surface of the clamping member, such as of the elongated clamping profile 15, 16. Herein, this is achieved by flat surface regions.

The locking unit 21 further comprises a third side 14c between the first side 14a and the second side 14b, configured to face the rigid support in the Intermediate locking unit state, wherein the first, second and third surfaces 14a, 14b and 14c are connected by curved surface regions.

In the shown embodiments, the membrane comprises a keder, which is a well-known technique for canvas/tarpaulin types of membranes. This is however not a requirement. Preferably, the end portion of the membrane, i.e. the part which is to be trapped in the elongated clamping profile, exhibits thicker portion(s), facilitating engagement and retainment by the elongated clamping profile when the connection system is in the Adjustment stage. Preferably, such thicker portion(s) will be elongated and parallel to a termination of the membrane. In a preferred embodiment, such elongated thicker portion is at the very termination of the membrane, as will for example be the case with a keder.

In another embodiment, the connection system 20 may secure overlapping of the two elements it connects. When for example connecting two membranes, the connection system 20 may be clamping a membrane 25 over a membrane 25', and either one or both membranes 25, 25' may even be crossing the connection system 20 and extend on both sides of the connection system 20, in which case one or both crossing membranes 25, 25' is/are clamped under both contact portions 17, 18. When for example connecting a membrane 25 to a panel 31, membrane 25 may cross the connection system 20 and be clamped on panel 31 under both contact portions 17, 18.

In order to improve the water-sealing and closing properties of the connection system, some improvements can be brought. For example, the elongated clamping profile may have several parallel surfaces configured to contact the membrane, thus multiplying the sealing contacts. For example, the rigid support may be adapted to reciprocate the contact surfaces of the elongated clamping profile, such as by providing an elongated depression where the elongated contact portions fit when in the Closed stage. Another possibility is to provide sealing surfaces of the elongated clamping profile, alternatively the rigid support surface, with an elastomer gasket or layer to improve sealing. Other sealing improvements known in the art can also be used.

In the case where the connection system is used for a flood barrier, or more generally for liquid containers, some improvements may be brought. A further flood barrier embodiment will now be described. Under the front edge of the horizontal panel, one may place a rubber foam gasket, which seals against water flowing under the horizontal panel. When the flood level rises, so does the water weight atop the horizontal panel. The hydrostatic forces of the water are twice as large in the gravitational direction than in the direction perpendicular to the vertical panel. As such, each module is self-stabilized and will not overturn. Additionally, the water weight increases the compression of the rubber foam gasket which helps seal the horizontal panel on the floor thus preventing water flowing below the horizontal panel. An eccentric latch is mounted on the front edge of the horizontal panel and latched onto the panel of the adjacent module such that the two rubber foam gaskets under the front edges are forced together and create a waterproof point of intersection.

Atop the front edge of the horizontal panel, one may also position anchors to be bolted to the ground to further increase the stability of the system and increase resistance against sliding. The anchors are mounted to the panels using wheelies, allowing the anchors to turn sideways granting freedom in terms of where the ground bolt goes.

The connection system according to the invention may also be used in other applications in which a membrane is to be attached to a rigid support, in particular in applications in which adjustment of the membrane may be desirable such as described herein. Such applications may e.g. include tents and water retention basins.

LIST OF REFERENCE NUMERALS

1—handle
2—lever body
3—lever base
4—axle
5—lifting spring
6—handle spring
7—washer
8—calibration bolt
9—connection bolt
10—contact surface
11—first groove
13—C-ring
14a—first side
14b—second side
14c—third side
15, 16—elongated clamping profiles
17, 18—contact portions
19—receiving portion
20—connection system
21—locking unit
25, 25'—membrane
26, 26'—keder
30—vertical panel
31—horizontal panel
32—hinge between vertical and horizontal panels
34—wires between panels
35—struts between panels
36—encapsulating member 37—brackets
38—intra-module eccentric latch
39—inter-module eccentric latch
40—flood barrier module system
41, 41'—modules
50—rigid support

The invention claimed is:

1. A connection system for connecting at least one membrane to at least one rigid support, the connection system comprising:
   at least one clamping member, and
   at least one locking unit configured for attaching the at least one clamping member to the rigid support, thereby clamping a portion of the at least one membrane between the at least one clamping member and the rigid support so as to achieve a sealing between the at least one membrane and the rigid support,
   wherein the at least one locking unit is a discrete state locking unit movable between several predetermined locking unit states, each locking unit state corresponding to a connection system stage, the predetermined locking unit states including:
      an open locking unit state in which the locking unit is configured to provide a gap between the clamping member and the rigid support, allowing the portion of the at least one membrane to be inserted between the clamping member and the rigid support, the open locking unit state corresponding to an open stage of the connection system,
      a closed locking unit state in which the locking unit is configured to press the clamping member toward the rigid support so that the at least one membrane is clamped between the clamping member and the rigid support, the closed locking unit state corresponding to a closed stage of the connection system in which a sealing is provided between the at least one membrane and the rigid support, and
      an intermediate locking unit state between the open locking unit state and the closed locking unit state, in which intermediate state the at least one membrane is allowed to slide with respect to the clamping member without disengaging therefrom, corresponding to an adjustment stage of the connection system,
   wherein the clamping member comprises sealing and/or closing improvement means,
   wherein the clamping member is an elongated clamping profile,
   wherein the at least one elongated clamping profile comprises a first elongated clamping profile and a second elongated clamping profile, the first elongated clamping profile extending at an angle with respect to the second elongated clamping profile,
   the connection system further comprising an intra-module eccentric latch provided on the second elongated clamping profile, the intra-module eccentric latch being configured to press an underlying membrane portion toward a rigid support and/or the first elongated clamping profile extending at an angle with respect to the second elongated clamping profile.

2. The connection system according to claim 1, wherein the connection system further comprises the rigid support, and wherein the connection system is configured for connecting at least two membranes extending on opposite sides of the rigid support.

3. The connection system according to claim 1, wherein the locking unit comprises a calibration member for adjusting the predetermined locking unit states.

4. The connection system according to claim 1, wherein the locking unit further comprises a locking means for locking the locking unit in the closed locking unit state.

5. The connection system according to claim 4, wherein the locking means is configured so that only an intentional human actuation will enable unlocking of the locking means.

6. A flood barrier module system comprising at least two modules which are mutually connected by a connection system of claim 1, at least one of the at least two modules comprising a membrane, a portion of which is engaged in the connection system, the flood barrier module system further including an inter-module eccentric latch configured to reinforce the connection between two adjacent horizontal panels of the at least two modules.

7. The flood barrier module system according to claim 6, wherein the portion of the at least one membrane comprises at least one stopping portion, the stopping portion being thicker than the membrane.

8. The flood barrier module system according to claim 7, wherein the at least one stopping portion is an elongated portion extending in parallel with the elongated clamping profile.

9. The flood barrier module system according to claim 8, wherein the at least one stopping portion is a keder.

10. The flood barrier module system according to claim 6, wherein the portion of the at least one membrane is an end portion of the membrane.

11. The flood barrier module system according to claim 6, wherein at least one of the at least two mutually connected modules comprises a panel, wherein the panel forms the rigid support to which the at least one elongated clamping profile is attached by means of the at least one locking unit.

12. The connection system according to claim 1, wherein sealing and/or closing improvement means comprises: at least one reciprocating extension and/or at least one elastomer gasket and/or at least one elastomer layer.

13. The connection system according to claim 1, wherein the locking unit comprises a calibration member configured to adjust the predetermined locking unit states.

14. A method for connecting two modules using a connection system, wherein at least one of the modules comprises at least one membrane, the method comprising the steps of:
   a. positioning the modules side-by-side,
   b. setting at least one locking unit in an open locking unit state such that the connection system assumes an open stage,
   c. inserting a portion of the at least one membrane between at least one clamping member and a rigid support,
   d. moving the at least one locking unit to an intermediate locking unit state such that the connection system assumes an adjustment stage and
   e. moving the at least one locking unit to a closed locking unit state, in combination with a connection system comprising:
   the at least one clamping member, and
   the at least one locking unit configured for attaching the at least one clamping member to the rigid support, thereby clamping a portion of the at least one membrane between the at least one clamping member and the rigid support so as to achieve a sealing between the at least one membrane and the rigid support,
   wherein the at least one locking unit is a discrete state locking unit movable between several predetermined locking unit states, each locking unit state corresponding to a connection system stage, the predetermined locking unit states including:
- an open locking unit state in which the locking unit is configured to provide a gap between the clamping member and the rigid support, allowing the portion of the at least one membrane to be inserted between the clamping member and the rigid support, the open locking unit state corresponding to an open stage of the connection system,
- a closed locking unit state in which the locking unit is configured to press the clamping member toward the rigid support so that the at least one membrane is clamped between the clamping member and the rigid support, the closed locking unit state corresponding to a closed stage of the connection system in which a sealing is provided between the at least one membrane and the rigid support, and
- an intermediate locking unit state between the open locking unit state and the closed locking unit state, in which intermediate state the at least one membrane is allowed to slide with respect to the clamping member without disengaging therefrom, corresponding to an adjustment stage of the connection system, wherein the clamping member comprises sealing and/or closing improvement means, wherein the clamping member is an elongated clamping profile, wherein the at least one elongated clamping profile comprises a first elongated clamping profile and a second elongated clamping profile, the first elongated clamping profile extending at an angle with respect to the second elongated clamping profile, the connection system further comprising an intra-module eccentric latch provided on the second elongated clamping profile, the intra-module eccentric latch being configured to press an underlying membrane portion toward a rigid support and/or the first elongated clamping profile extending at an angle with respect to the second elongated clamping profile, wherein the method further comprises tightening the intra-module eccentric latch to press the intra-module eccentric latch towards the rigid support and/or the first elongated clamping profile extending at an angle with respect to the second elongated clamping profile so that an encapsulating member, provided on an end of the second elongated clamping profile that faces the first elongated clamping profile, encapsulates a membrane termination and pushes the membrane termination into a substantial 90° angle that reciprocates a corner between the first and second elongated clamping profiles.

15. The method of claim 14, wherein the method comprises a further step of adjusting the at least one membrane relative to the rigid support, said further step being performed between step d and step e of the method.

\* \* \* \* \*